No. 638,859. Patented Dec. 12, 1899.
P. H. WHITE.
SWITCH FOR ELECTRICALLY PROPELLED VEHICLES.
(Application filed May 15, 1899.)
(No Model.) 2 Sheets—Sheet 1.

WITNESSES: INVENTOR
C. S. Frye Paul H. White,
J. A. Walsh BY
Chester Bradford,
ATTORNEY.

No. 638,859. Patented Dec. 12, 1899.
P. H. WHITE.
SWITCH FOR ELECTRICALLY PROPELLED VEHICLES.
(Application filed May 15, 1899.)
(No Model.) 2 Sheets—Sheet 2.
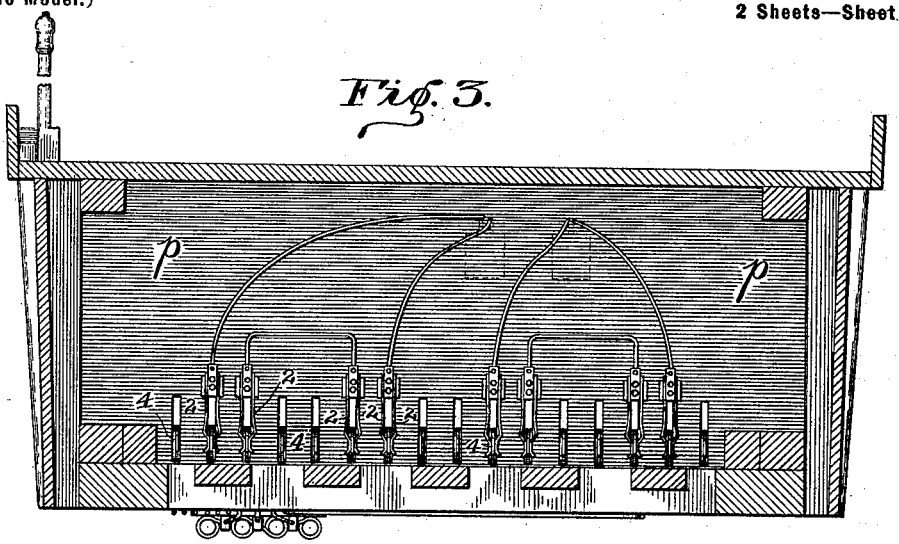
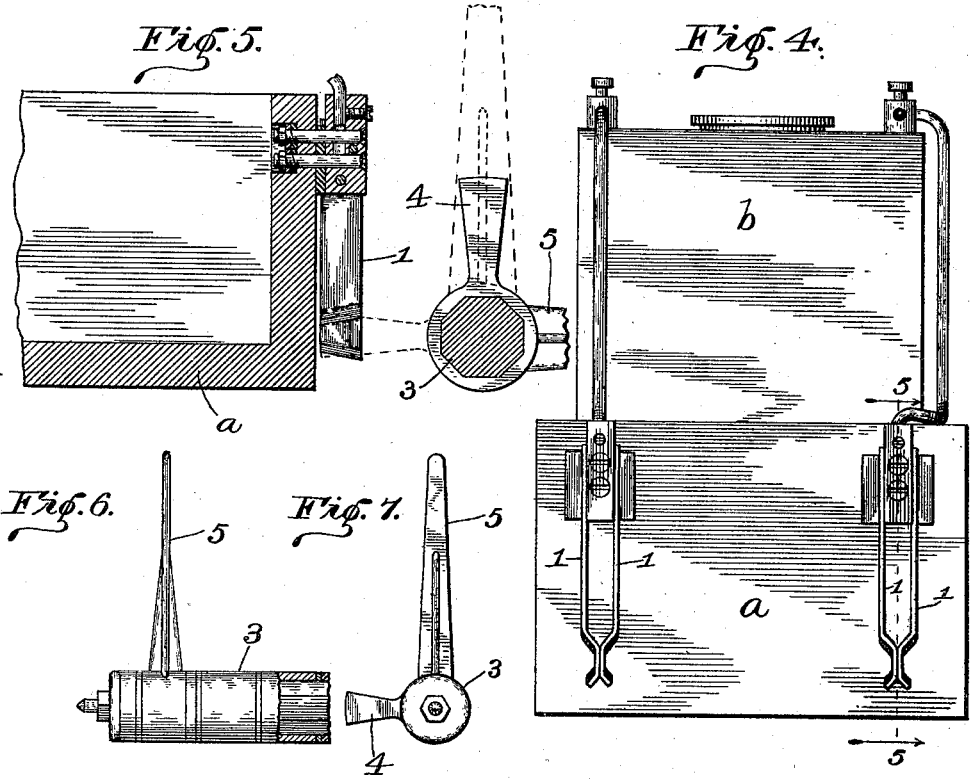
WITNESSES:
INVENTOR
Paul H. White,
BY
Chester L Bradford,
ATTORNEY.

United States Patent Office.

PAUL H. WHITE, OF INDIANAPOLIS, INDIANA, ASSIGNOR TO CHARLES F. SMITH, OF SAME PLACE.

SWITCH FOR ELECTRICALLY-PROPELLED VEHICLES.

SPECIFICATION forming part of Letters Patent No. 638,859, dated December 12, 1899.

Application filed May 15, 1899. Serial No. 716,810. (No model.)

*To all whom it may concern:*

Be it known that I, PAUL H. WHITE, a citizen of the United States, residing at Indianapolis, in the county of Marion and State of Indiana, have invented certain new and useful Improvements in Switches for Electrically-Propelled Vehicles, of which the following is a specification.

The object of my invention is to provide in an electrically-propelled vehicle a means whereby certainty and celerity in connecting and disconnecting the several batteries and in making and breaking the electric circuit may be secured. Said invention will be first fully described and the novel features thereof then pointed out in the claims.

Figure 1:
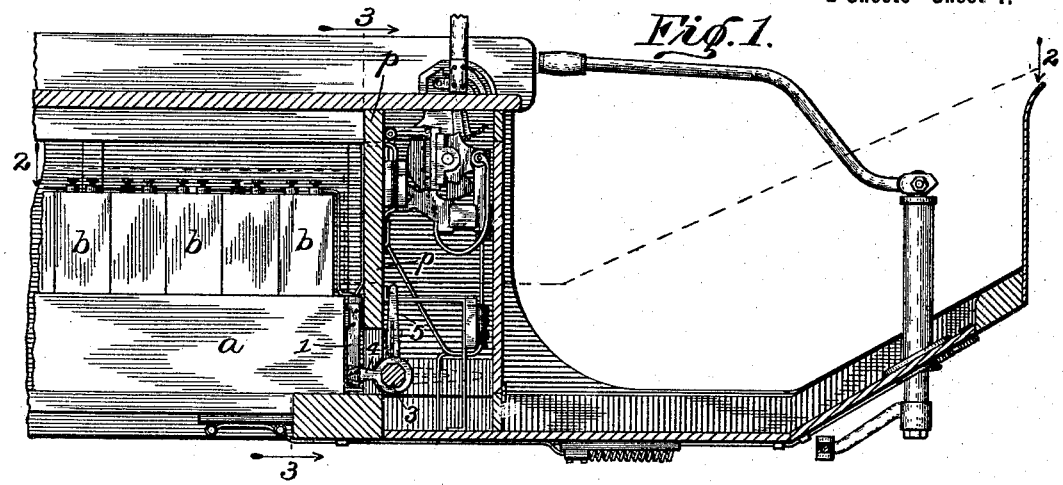
Figure 2:
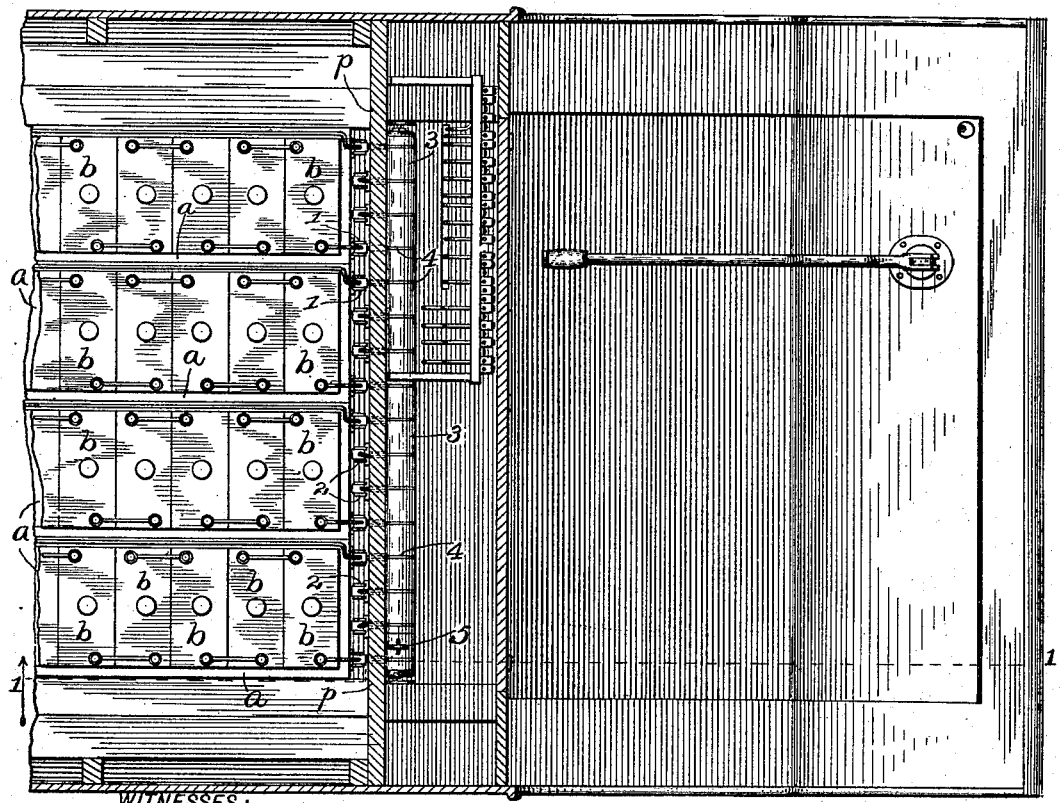

Referring to the accompanying drawings, which are made a part hereof, and on which similar reference characters indicate similar parts, Figure 1 is a longitudinal vertical sectional view through the front portion of the body of a vehicle provided with storage batteries as a means of propulsion, as seen from the dotted line 1 1 in Fig. 2; Fig. 2, a view, partly in horizontal section and partly in top plan, as seen from the dotted line 2 2 in Fig. 1; Fig. 3, a view looking toward the rear side of a partition in the vehicle-body just in front of the storage batteries from the dotted line 3 3 in Fig. 1, showing the electrical connections which are usually mounted on said partition in a vehicle embodying my invention; Fig. 4, a front elevation of one of the storage-battery boxes with the batteries mounted therein and provided with the electrical connections which I employ, as seen when looking rearwardly from the dotted line 3 3; Fig. 5, a fragmentary sectional view of a portion of the front end of one of the battery-boxes as seen from the dotted line 5 5 in Fig. 4; Fig. 6, an elevation showing a fragment of the rock-shaft carrying the arms or wings by which as said shaft is rocked in one direction or the other the electrical connections are made or broken, and Fig. 7 an end elevation of the parts shown in Fig. 6.

The present invention relates solely to the means of connecting and disconnecting the storage batteries and making and breaking the electric circuit. I have shown the invention in place in an electrically-driven vehicle, and the drawings include the adjacent and related parts of such a vehicle of an improved form; but such adjacent and related parts may be of any desired construction, and as they form no part of my present invention they will not be further described herein, except incidentally in describing said invention.

In the vehicle shown there are four battery-boxes $a$, each of which contains several storage batteries $b$, coupled together and ready for use, as will be readily understood. On the front of each of these battery-boxes I have secured spring contact-pieces 1, arranged in pairs, the lower ends of which are held toward or against each other by the inherent spring force of the parts. The form of these contacts is best shown in Fig. 4.

The partition $p$ of the vehicle-body has in its lower edge numerous slits, as shown in Fig. 3, and spring-contacts 2, similar in form to the spring-contacts 1, are appropriately secured to the rear side of said partition and pass down alongside certain of the slits therein. When the various parts of the carriage are assembled, these contacts on the partition $p$ are interspersed among the corresponding spring-contacts on the front ends of the battery-boxes $a$.

Extending along in front of the partition $p$ is a rock-shaft 3, having thereon numerous wings 4, and in the construction of the rock-shaft as a whole there is suitable insulating and conducting material by which proper electrical insulation is maintained between certain of said wings 4, while others are electrically connected together. Such electrical connection and insulation, however, being common and well known need not be here especially described, as these will be well understood by persons skilled in the art. The two positions which the rock-shaft occupies at various times are shown by the full lines and the dotted lines in Fig. 1 and also in Fig. 5. When occupying the position shown by the full lines in Fig. 1 and the dotted lines in Fig. 5, the wings 4 extend back through the slits in the lower edge of the partition $p$ and are in contact with the various contact members 1 and 2, and by this means proper electrical connections are established in the vehicle. When, however, it is desired to break these connections, thus opening the electric circuit and disconnecting the several batteries, it is done by moving the rock-shaft into the position shown by the dotted lines in Fig. 1 and the full lines in Fig. 5. The moving of this shaft is conveniently done by means of the arm or handle 5.

By the use of my invention all wires for connecting the batteries are wholly dispensed with and all uncertainties incident to the use of wire connections thus avoided. When it is desired to remove the batteries from the vehicle, the boxes containing said batteries are simply pulled out, and they are restored to position by merely pushing them into place. They are all instantly and simultaneously electrically connected or disconnected, as may be desired, by simply moving the rock-shaft, and it is impossible where this device is used to make a wrong connection. Vehicles of this character are necessarily taken care of and operated by persons unskilled in the manipulation and use of electrical devices, and it frequently happens where the connections are made in the ordinary way that they are wrongly made and with disastrous results. Such results are rendered impossible where my invention is employed.

I have not considered it necessary to illustrate the motor or any running-gear, and these may be understood to be of any usual or desired character.

Having thus fully described my said invention, what I claim as new, and desire to secure by Letters Patent, is—

1. The combination, in an electrically-driven vehicle, of storage batteries, suitable contacts connected thereto, other contacts mounted on an adjacent portion of the vehicle-body, and a rock-shaft provided with wings adapted as the shaft is rocked to engage with said contacts and thus electrically connect or disconnect said batteries and make or break the electric circuit, substantially as set forth.

2. The combination, in an electrically-driven vehicle, of the vehicle-body containing suitable ways for the battery-boxes, said battery-boxes, the batteries therein, pairs of spring-contacts mounted on the front ends of said battery-boxes, other pairs of spring-contacts forming the terminals of the electric circuit leading from said batteries and mounted on an adjacent portion of the vehicle-body, and a rock-shaft arranged alongside said spring-contacts and provided with wings which are adapted to be thrown into or out of connection with said contact as said shaft is revolved, substantially as and for the purposes set forth.

In witness whereof I have hereunto set my hand and seal, at Indianapolis, Indiana, this 13th day of May, A. D. 1899.

PAUL H. WHITE. [L. S.]

Witnesses:
W. A. COFFMAN,
JAMES A. WALSH.